Patented Apr. 21, 1936

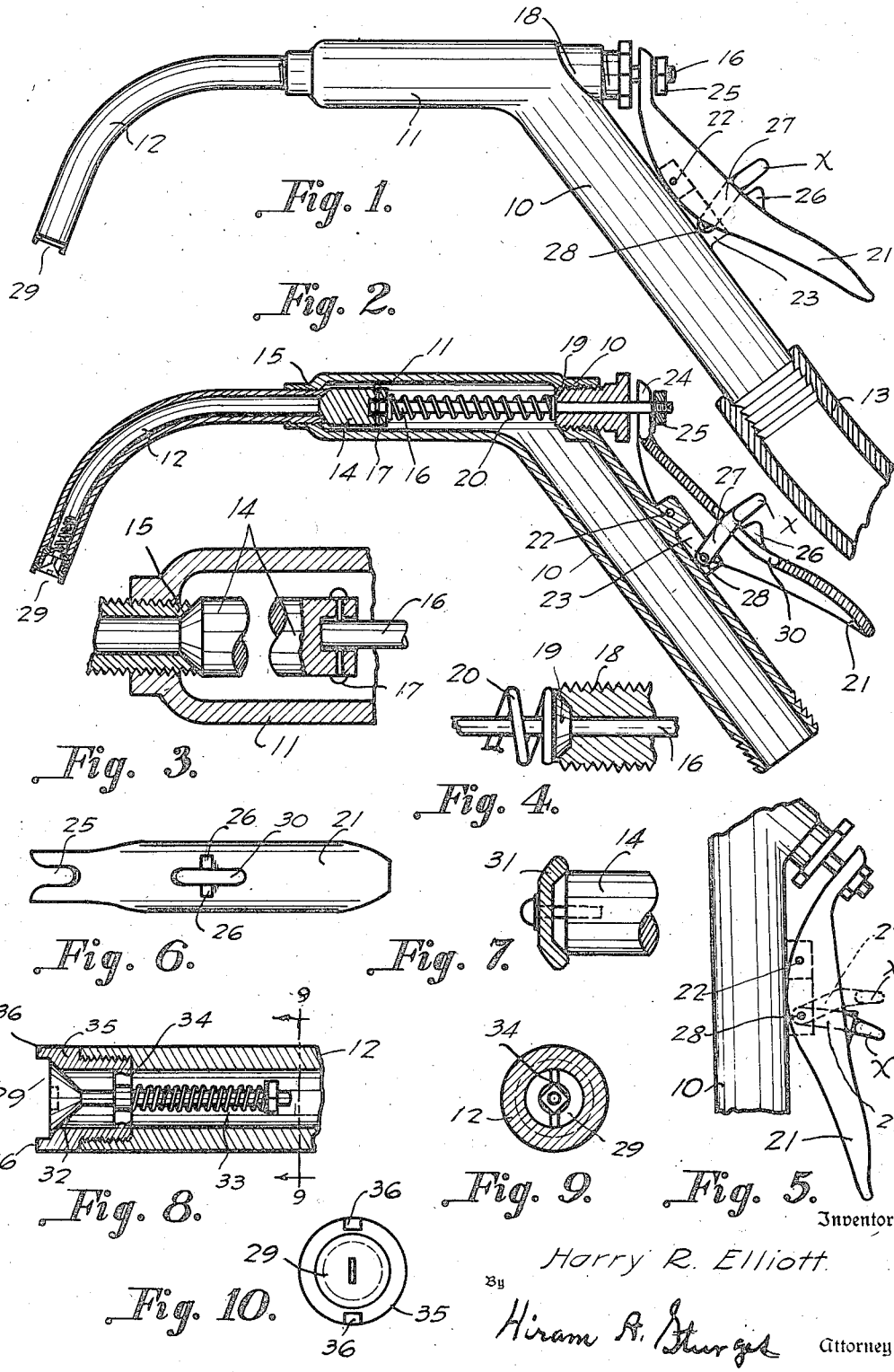

2,038,508

UNITED STATES PATENT OFFICE 2,038,508

LUBRICANT DISPENSING NOZZLE

Harry R. Elliott, Omaha, Nebr., assignor to M. & E. Manufacturing Company, Omaha, Nebr.

Application January 21, 1935, Serial No. 2,766

1 Claim. (Cl. 251—164)

This invention relates to a lubricating nozzle adapted to be used at garages and filling stations in transferring grease, oils and liquids from one container to another, and for use, specifically by an operator working below a motor vehicle, who while pumping with one hand uses the other hand for a control of the nozzle while pumping grease or other lubricant into the transmission case or to other parts.

The object of the invention, broadly, is to provide a nozzle having a release-valve which may be automatically locked in open position to permit a continued discharge flow of a lubricant, and may be conveniently closed. By use of the device this work of lubrication may be speedily accomplished.

The invention includes certain specific features of advantage, such as means for adjusting the valve to determine its distance of movement from its seat, depending upon the consistency of the lubricant, also providing a pivotal mounting for the release-valve on its reciprocating stem so that it will accurately engage its seat.

Since the nozzle is generally held in upright position for effective operation the invention includes the form shown in the drawing, and especially includes the use of a spring-controlled rocker-plate on the tubular handle adapted to be gripped by the hand of the operator, and includes a terminal valve opened by pressure of the grease for preventing dripping or waste of the lubricant.

With these objects in view the invention presents a new and useful construction, combination and arrangement of parts as described herein and claimed, and as shown in the drawing, it being understood that changes may be made in form, size, proportion of parts and minor details, said changes being within the scope of the invention as claimed.

In the drawing, Fig. 1 is a side view of a lubricant dispensing nozzle, and Fig. 2 is a view of the same in longitudinal section.

Fig. 3 is a broken detail partly in section on an enlarged scale showing the release-valve, valve seat, and pivotal mounting of the valve on the valve stem.

Fig. 4 is a sectional detail showing packing for the valve stem.

Fig. 5 is a side view of the rocker-plate showing the locking means in position for maintaining the release-valve open, to permit a flow of liquid, the dotted lines showing the position of the locking means for permitting the closing of the valve to prevent a flow of liquid.

Fig. 6 is a plan view of the rocker-plate showing a slot therein and a pair of lugs.

Fig. 7 is a detail illustrating a modified form for the end of the valve, useful in some instances.

Fig. 8 is a sectional view of a terminal sanitary valve and its seat. Fig. 9 is a sectional view through the arcuate discharge-pipe on line 9—9 of Fig. 8, and Fig. 10 is an end view of the discharge-pipe and sanitary valve.

Referring now to the drawing for a more particular description, the nozzle consists, in part, of a tubular handle 10, a tubular extension 11 projecting therefrom at a suitable angle and a terminal discharge pipe 12 threaded in the end of the extension, said extension preferably being disposed at an obtuse angle to the handle so that the device will be approximately of arcuate form to permit convenient use.

Numeral 13 indicates a hose which is attached to the lower end of the tubular handle, and it will be understood that the lubricant moved into the device will be under pressure.

Numeral 14 indicates a release-valve having a valve seat 15 in communication with the discharge pipe 12 and in communication with the tubular extension 11 subject to the control of the valve 14.

As best shown in Fig. 3, the release-valve is pivotally mounted on its valve stem 16 by means of a pivot 17.

At the junction of the extension 11 with the handle 10 an apertured supporting-block 18 is threaded in said extension and it provides a slidable mounting for the valve stem 16, and at 19 is indicated packing which is provided for said block 18.

Numeral 20 indicates a spring carried by the valve stem with its ends abutting upon the valve and block 18, said spring therefore operating normally to resist disengagement of the valve from its seat.

It will be noted that the parts mentioned within the extension may be conveniently assembled therein after the threaded block 18 has been removed.

Numeral 21 indicates a rocker-plate which is mounted between its ends to swing from a pivot 22, a bracket 23 being provided on the handle 10 for this pivotal mounting.

The upper end of the rocker-plate 21 is provided with a slot 24 for receiving an end of the valve stem, said stem being threaded for an adjusting-nut 25 to be mounted thereon, and it is obvious that a rotation of this nut in one direction will decrease the distance of movement of the valve from its seat, and a rotation of said nut in an opposite direction will increase the distance which the valve may move, this feature being of advantage since the lubricant to be injected to the bearings to be greased may vary in consistency.

As thus described, the handle 10 and rocker-plate 21 may be grasped by the hand of an operator for moving the free end of the rocker-plate toward the handle to cause the valve 14 to leave its seat, and a lubricant under pressure will continue to be discharged through the terminal pipe 12 so long as the rear end of the rocker-plate is held in its downward position, and when the pressure on the rocker-plate is discontinued the valve, by action of the spring 20, will move to its seat.

However, to avoid loss of time and to provide convenience in operation, the top of the rocker-plate is provided with a pair of lugs 26 which operate as catch-members.

At 27 is indicated a swingable thumb piece or latch-member which is pivotally mounted at 28 on the bracket 23, and in operation, to cause the valve 14 to leave its seat for discharging a lubricant from the nozzle, the operator may press the free end of the rocker-plate toward said handle, the lubricant, under pressure, being discharged from pipe 12, and when the rocker-plate is pressed toward the handle, as mentioned, the latch-member 27 will automatically swing in the slot 30 (Figs. 2 and 6) to the position shown in solid lines in Fig. 5, rearwardly of the pair of lugs 26 to permit its lugs $x$ to engage said lugs 26 for locking the valve in open position, and therefore it will not be necessary for an operator to perform any further acts in obtaining a constant discharge of a lubricant, and if desired, the operator may then use both hands for pumping the lubricant as heretofore mentioned.

It will be understood that if a flexible contact-pad 31 is secured to the end of the valve head 14 as shown in Fig. 7 of the drawing, the herein described invention could be used in connection with gasoline, kerosene, naptha and similar liquids, all other parts remaining as described, the comparatively flexible pad 31 preventing the formation of gas or leakage.

It is important for operation that the discharge-pipe 12 shall have an arcuate form, its downwardly curved terminal providing a holder-hook for readily entering the intake of the differential case and transmission case (not shown) and, by its own weight, may be supported in discharging position for the purpose explained, so that both hands of an operator may be used for working the grease pump as above set forth.

Numeral 29 indicates a sanitary valve normally engaging a valve seat 32 in the end of the curved discharge-pipe 12, and in operation, by force of a lubricant under pressure said valve 29 will move outwardly from its seat, subject to the action of a spring 33 abutting upon an anchor-member 34 carried by a sleeve 35 which is threaded in the end of said tube 12.

Since the grease used for lubrication is not always clean it is important that the valves may be conveniently removed to permit them to be cleaned, and therefore the valves, in the present construction are removable.

The advantage in the use of this valve 29 is to prevent leakage from the discharge pipe 12, said valve being needed only in instances when the lubricant consists of oil or soft grease. The sleeve 35 is provided with lugs 36 to facilitate convenient removal from the discharge-pipe.

I claim as my invention,—

In a dispensing nozzle for a liquid under pressure, a tubular handle having an extension provided with a valve seat, a spring-controlled valve for the valve seat and a valve stem projecting outwardly of said extension, a rocker-plate pivotally mounted between its ends on the tubular handle and connected with the valve stem and provided, longitudinally, adjacent to its pivotal mounting with a slot and a pair of lugs at the sides of the slot, and a thumb-piece provided with lugs and pivotally mounted on the handle for a swinging movement in the slot to dispose its lugs forwardly of the lugs on the rocker-plate, to permit movements of the rocker-plate and valve stem for an engagement of the valve with the valve seat, and for a swinging movement in said slot to dispose its lugs rearwardly of said lugs on the rocker-plate for maintaining the valve in disengagement with said valve seat.

HARRY R. ELLIOTT.